May 4, 1926.
W. E. GREENAWALT
APPARATUS FOR TREATING LIQUIDS WITH GASES
Filed June 29, 1922
1,583,591
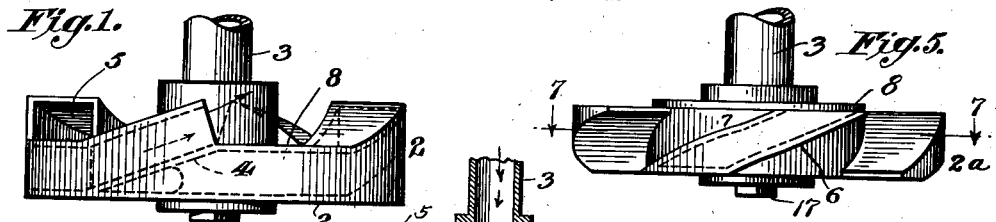
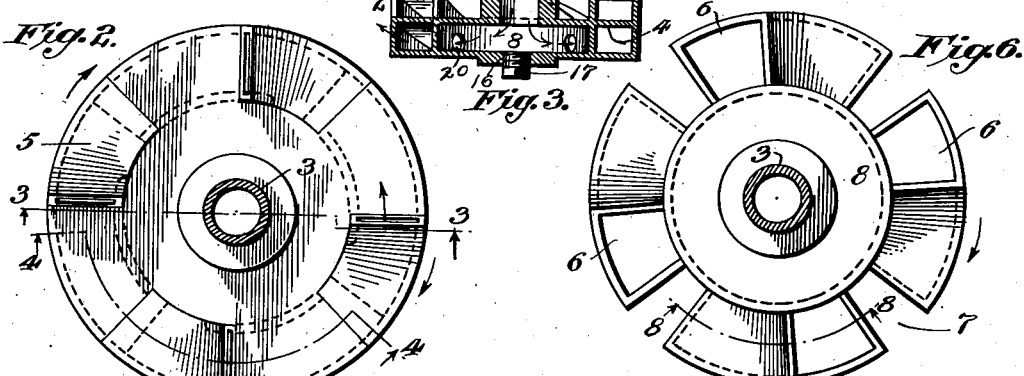
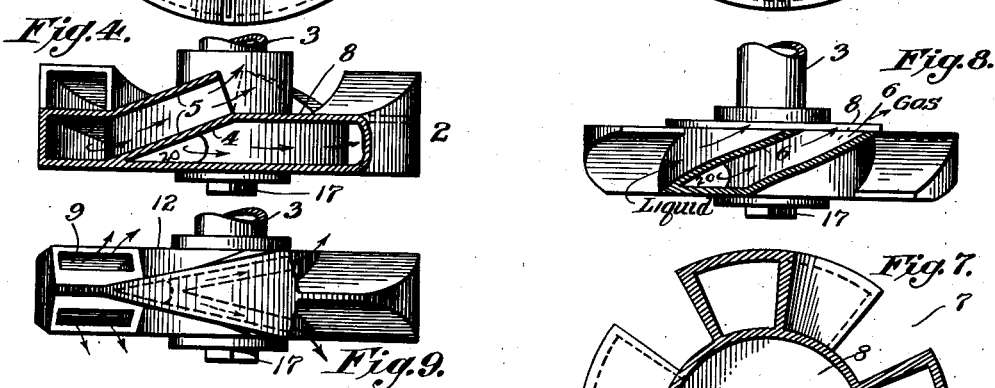
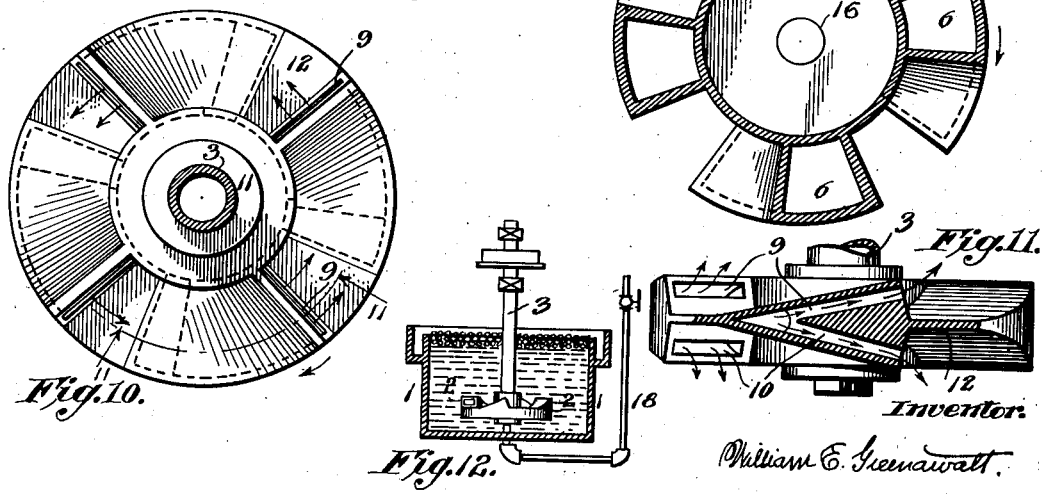
Inventor.
William E. Greenawalt Patented May 4, 1926.

1,583,591

UNITED STATES PATENT OFFICE.

WILLIAM E. GREENAWALT, OF DENVER, COLORADO.

APPARATUS FOR TREATING LIQUIDS WITH GASES.

Application filed June 29, 1922. Serial No. 571,819.

*To all whom it may concern:*

Be it known that I, WILLIAM E. GREENAWALT, a citizen of the United States, residing in the city and county of Denver and State of Colorado, have invented certain new and useful Improvements in Apparatus for Treating Liquids with Gases, of which the following is a specification.

The invention has for its object the effective atomization, or fine subdivision, of gas in liquid, to accomplish certain results, as for example, the application of gas to liquids to facilitate desired chemical reactions, and in the flotation treatment of ores.

This invention may be considered as an improvement, or modification, of that described in patents issued to William E. Greenawalt, No. 1,374,500, April 12, 1921; No. 1,374,446, April 12, 1921; and No. 1,374,445, April 12, 1921.

In the operation of the apparatus described in the above mentioned patents, it was found that excellent results were obtained under some conditions and for some purposes by emphasizing the suction action of the stream of liquid in proximity to the gas outlets of the rotary member. The object of the present invention is to embody these observations in an appartaus so that they can be given full practical application.

The invention can best be described by referring to the accompanying drawings, in which Fig. 1 shows one form of atomizer, or rotary gas diffusing member, in elevation, Fig. 2 the corresponding plan, Fig. 3 the corresponding vertical section on the line 3—3 of Fig. 2, Fig. 4, a vertical section, on the line 4—4 of Fig. 2: Fig. 5 shows a modified form of atomizer, in elevation, Fig. 6 the corresponding plan, Fig. 7 a horizontal section on the line 7—7 of Figure 5, Fig. 8 a vertical section, on the line 8—8 of Fig. 6: Fig. 9 shows another modified form of atomizer, in elevation, Fig. 10 the corresponding plan, Fig. 11 a vertical section, on the line 11—11 of Fig. 10: and Fig. 12, a general vertical section of the apparatus showing the relation of the atomizer, or rotary gas diffusing member, to the liquid in the tank.

Referring to the drawings, 1 is a tank adapted to contain the liquid to be treated, 2 is a rotary atomizer suspended within the tank and submerged in the liquid by means of the hollow shaft 3. The atomizer has a hollow interior 8 communicating with the hollow shaft 3, and is provided with discharge passages 5 extending upwardly from the bottom toward the top, along the periphery. These discharge passages are formed by the vanes 4, or partitions, so that the gas is ejected, from the hollow interior chamber, upwardly and outwardly into the surrounding liquid in the tank. The openings 20, between the hollow interior or gas chamber and the discharge passages, permit air or liquid or both to flow from the gas chamber into the discharge passages. When the atomizer is rotated at a proper speed the air, or gas, will be sucked down through the hollow shaft. Similarly, it may be sucked up through a stationary pipe in the bottom with its outlet in the interior of the atomizer. The speed of rotation will usually range from 250 to 800 R. P. M., depending on the size of the atomizer.

In the modification 2$^a$, shown in Figs. 5, 6, 7 and 8, the discharge passages 6 are located along the periphery of the hollow central chamber, with the outlet of the discharge passage at the top. These discharge passages 6 alternate with liquid spaces 7, so that when the atomizer is rotated in the direction shown by the arrows at the periphery, intense liquid currents will flow along the slanting top and bottom of the discharge passages and create an intense suction, or ejector action, at the outlet of the gas discharge passage 6. Both the gas, and the liquid passing through the liquid space 7, will be ejected at an angle to the plane of rotation. As shown, the gas and liquid will be ejected upwardly and outwardly into the surrounding liquid in the tank. When the atomizer is rotated at the proper speed, air, or gas, will be sucked down through the hollow shaft 3, into the central chamber 8, and from the chamber 8 it flows into the discharge passages 6, and is ejected in a fine state of subdivision into the surrounding liquid. The flow of liquid induced by the discharge passages 6 tends to thoroughly distribute the atomized gas.

In the modification 2$^b$, shown in Figs. 9, 10, and 11, the gas passages 9 and 10 are shown as directed both upwardly and downwardly, instead of only upwardly as shown by 6, in Figs. 5 to 8. The central chamber is shown by 11, and projecting radially from the central chamber are the discharge passages 9 and 10, and preferably secured to a horizontal web or disc 12. The discharge passage 9 is directed upwardly and the discharge passage 10 is directed downwardly, so that when the atomizer is rotated the gas and liquid are ejected upwardly, downwardly, and outwardly.

The ejecting of a mixture of gas and liquid from the interior of the atomizer, or from the interior of the gas discharge passages, into the surrounding liquid in the tank gives a finer atomization than when only gas is ejected. If it is desired to eject a mixture of gas and liquid, the liquid may be introduced into the interior through a hole 16 in the lower portion of the atomizer, and this hole may be closed by the plug 17, if it is desired to eject only air.

If desired gas may be sucked into the atomizer through the pipe 18 by inserting the outlet of the pipe into the hole, shown by 17, in the bottom of the atomizer.

In operating the apparatus, the tank may be assumed to contain pulp mixed with the necessary flotation agents. When the atomizer is rotated at the necessary speed, or say, at a peripheral speed of from 800 to 1800 feet per minute, a vacuum will be formed at the outlets of the discharge passages by their inclined upper walls, while at the same time the liquid in the tank will be forced upwardly. The vacuum so produced will cause either gas or liquid to flow into the interior of the atomizer, if proper channels are provided for the flow. If the atomizer communicates with the air through a hollow shaft, and has no other inlet, air alone will flow into the interior of the atomizer through the hollow shaft, and from the interior of the atomizer it will flow through the openings 20 into the discharge passages and from there it will be ejected into the surrounding liquid in the tank. Under these conditions the air will be subdivided into fine bubbles and be fairly uniformly distributed through the liquid in the tank. If the interior of the atomizer communicates with the air through a hollow shaft, and a hole is provided in the bottom of the atomizer, air will flow down the hollow shaft into the interior of the atomizer and liquid will flow through the hole from the tank into the hollow interior of the atomizer, and both the air and liquid will be ejected into the surrounding liquid in the tank. If the air is introduced into the interior of the atomizer through the stationary pipe 18, air will flow through the pipe into the interior of the atomizer, and liquid will flow in through the hole, and both the air and liquid will be ejected into the surrounding liquid, much the same as when the air is sucked down through the hollow shaft.

I claim:

1. In apparatus for treating liquid with gas, a tank adapted to contain liquid, a hollow rotary member having a continuous cylindrical peripheral wall journaled in the tank and submerged in the liquid, said rotary member having open hollow discharge passages with inclined top walls within the area enclosed by the peripheral wall of the hollow rotary member, a communicating channel between the interior of the hollow rotary member and the tank to permit the flow of liquid from the tank into the interior of the hollow rotary member, means for delivering gas into the interior of the hollow rotary member, said interior of the rotary member being arranged so that the gas and liquid will be ejected as a mixture through the discharge passages into the surrounding liquid in the tank.

2. In apparatus for treating liquid with gas, a tank adapted to contain liquid, a hollow rotary member having a continuous cylindrical peripheral wall journaled in the tank and submerged in the liquid, said hollow rotary member having open hollow discharge passages with inclined top walls within the area enclosed by the peripheral wall of the hollow rotary member, an opening in the lower portion of the hollow rotary member to permit the flow of liquid from the tank into the interior of the hollow rotary member, means for introducing gas into the interior of the hollow rotary member through said opening from a stationary gas inlet in the lower portion of the tank, said interior of the hollow rotary member being arranged so that the gas and liquid will be ejected together through the discharge passages into the surrounding liquid in the tank.

WILLIAM E. GREENAWALT.